2,900,147
DUCT APPENDIX BALLOON

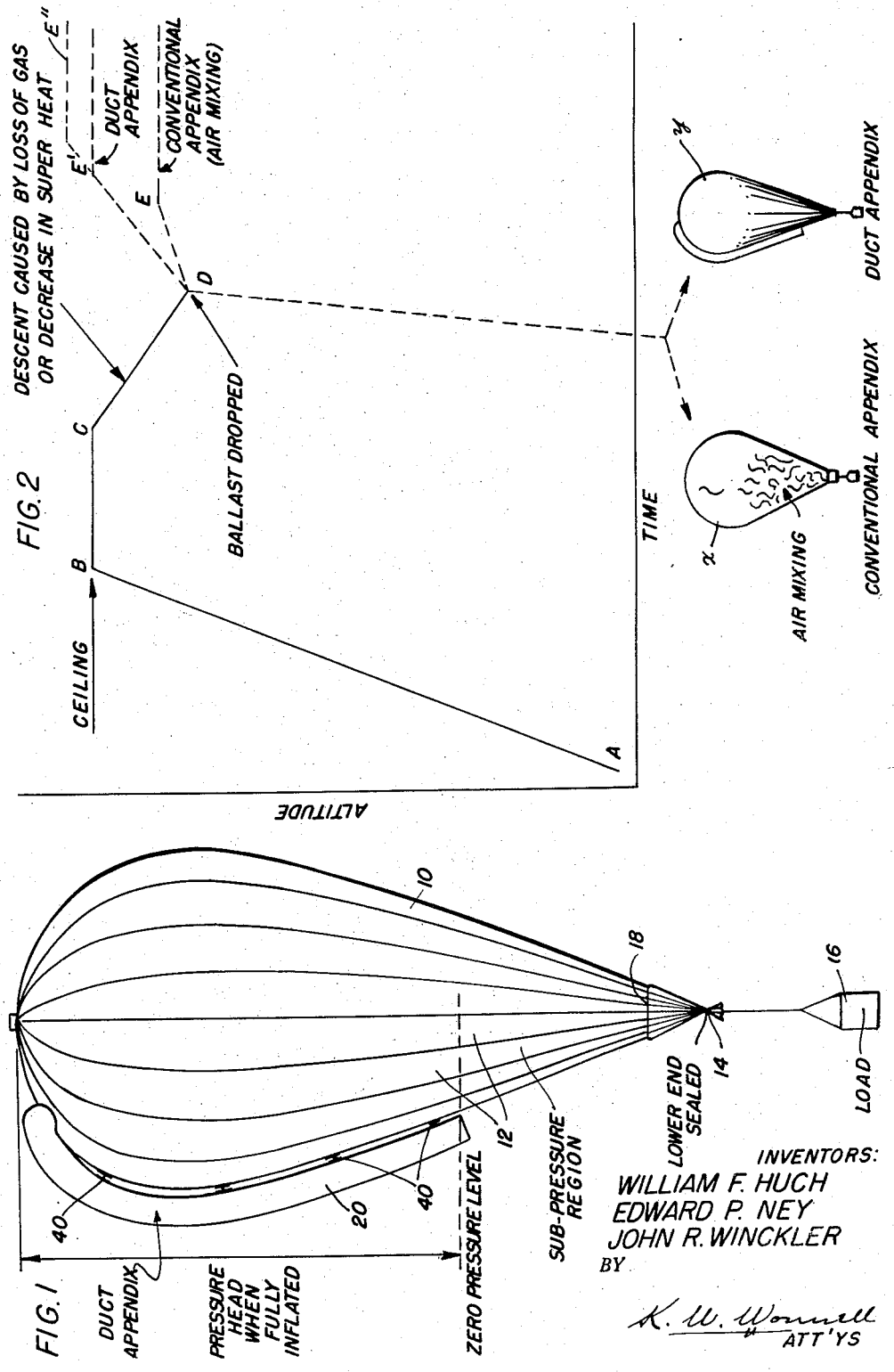

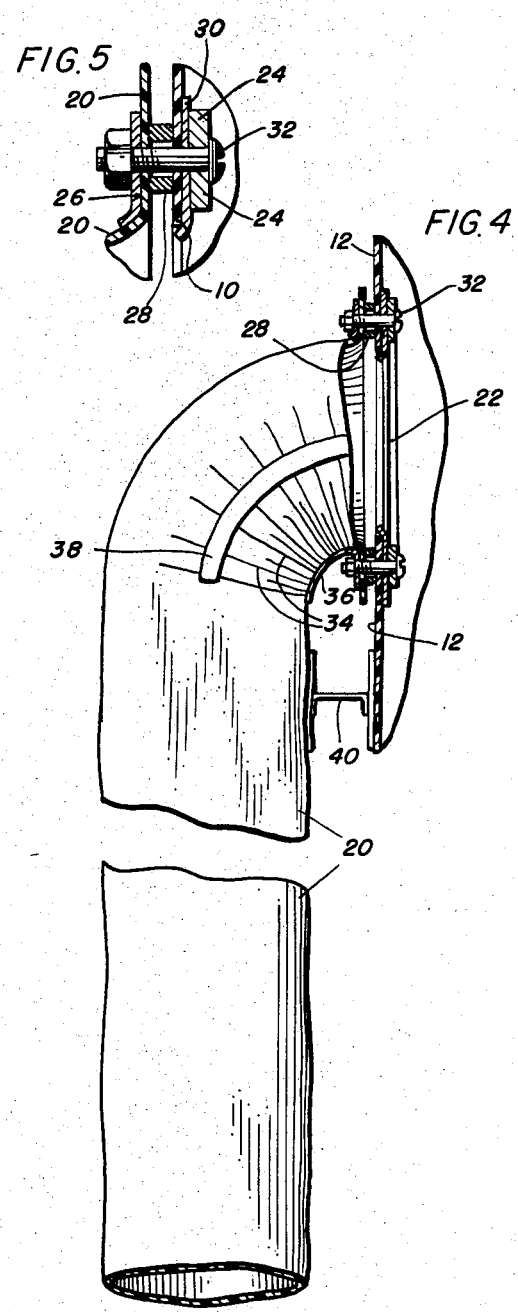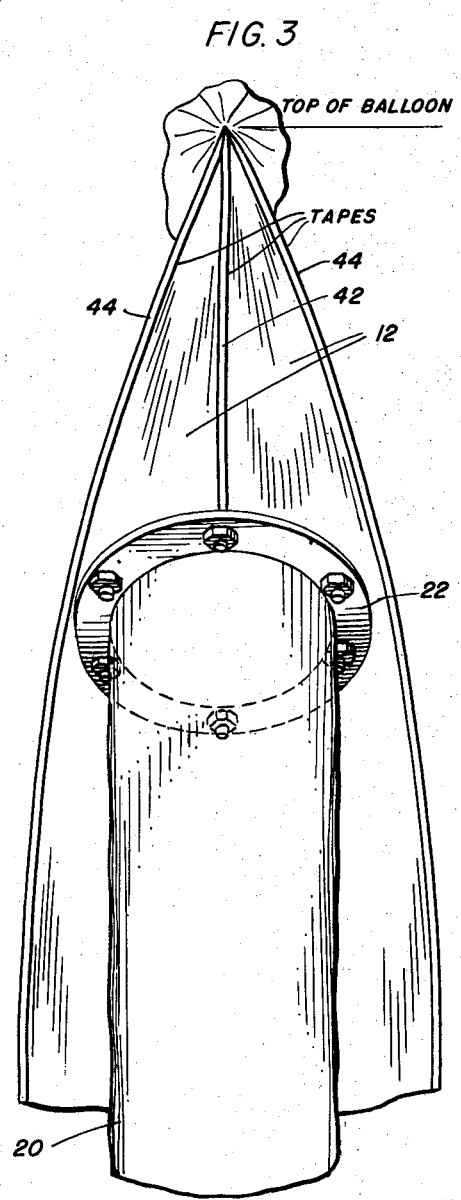

William F. Huch, St. Paul, Edward P. Ney, Minneapolis, and John R. Winckler, St. Paul, Minn., assignors, by mesne assignments, to the United States of America as represented by the Secretary of the Navy Application November 30, 1954, Serial No. 472,265

5 Claims. (Cl. 244—31)

This invention relates in general to a balloon resembling the ordinary conventional balloon having a filling opening at the bottom but differs therefrom in providing a tubular duct appendix connected at one end to the upper portion of the balloon, extending on the outside thereof and open at the lower end which is so located as to permit free valving of inflation gas at altitudes above a predetermined ceiling altitude.

This construction permits the flight reascent of a simple open appendix, nonextensible balloon to a ceiling altitude with its original inflation gas undiluted by air. This construction also permits valving of gas at a lower internal balloon pressure than by the former method in which the appendix is at the bottom of the balloon, causing less stress on the balloon structure for a given load.

An impotrant object of the invention is the utilization of a duct appendix connected to the balloon in such a manner as to permit free valving of inflation gas at a ceiling altitude and in which, at all times during the flight, there is a higher pressure in the duct than at the duct exit so that there is no possibility of a reverse flow of air to dilute the inflation gas.

A further object of the invention is to provide a balloon in which the lower end is properly sealed or tied off, thereby excluding the undesirable entry of air into the subpressure region normally at the base of a balloon when the balloon is not completely full. This exclusion of air permits repeated climbs to the initial ceiling altitude.

Other objects of the invention will apear in the specification and will be more apparent from the accompanying drawings in which:

Fig. 1 is a side elevation of a balloon having an appendix attached thereto in accordance with this invention;

Fig. 2 is a diagrammatic representation of the comparative action during flight of a balloon with a conventional appendix and a duct appendix balloon in accordance with this invention;

Fig. 3 is a view representing the attachment of one end of the duct appendix in one of the gores of a balloon;

Fig. 4 is a side elevation of some of the parts of the section showing the attachment of a duct appendix through the wall of the balloon; and Fig. 5 is a sectional detail of a duct clamping ring.

A free balloon of this type is only partially inflated with lift gas when it leaves the ground. As it rises, the gas expands and proceeds to fill out the balloon with decrease in atmospheric pressure. To prevent the balloon from rising above the desired ceiling altitude, and excessive strain or bursting of the baloon fabric, provision is made for valving gas from the balloon. In the conventional free balloon such excess gas is discharged through an appendix at the bottom of the balloon, which at the time is completely full. This type of discharge enables air to enter at the bottom and mix with the gas in the balloon, with the result that the ceiling altitude is lowered on every discharge.

In a free balloon, when aloft and incompletely filled, the gas in the upper part of the balloon is above the atmospheric pressure thereat, or at what is known as superpressure, the gas at an intermediate level is at the atmospheric pressure at that level, or at what is known as zero pressure, and below that level the gas below the atmospheric pressure thereat, or at what is known as subpressure. These facts are taken advantage of in accordance with the invention, to among other things enable a given balloon to have a preselected ceiling altitude which may be below the ceiling altitude of a bottom appendix balloon and at the same time prevent air from mixing with the gas in the balloon.

Certain relationships must be maintained between the balloon volume, the diameter of the balloon, and the valving or zero pressure differential, location of the lower end of the duct appendix in order to regulate and control heights to which the balloon will rise and to maintain it substantially at the predetermined elevation.

Referring now more particularly to the drawings, a balloon 10 of conventional shape with a rounded spherical top and a tapered lower end may be made of a plurality of gores 12 secured together by tapes or having heat-treated or welded joints at the edges of the gores securely fastening them together. The lower end of the balloon may be sealed by a suitable tie 14 and a load 16 is connected to a load ring 18 or to the tie in any suitable manner.

A duct appendix 20 is preferably formed of a sleeve of uniform diameter and of the same material, such as polyethylene or other suitable plastic material of which the balloon may also be constructed. The appendix 20 is of sufficient length to extend from the top of the balloon 10 to a point well below a level midway of the height of the balloon. The position of the lower end of the appendix 20 may be varied relatively higher or lower to correspondingly vary the ceiling altitude of the balloon. This variation in ceiling altitude is accomplished simply by making the appendix 20 longer or shorter as the case may be.

The upper end of the duct appendix 20 is connected to one of the gores 12 in any suitable manner, as shown, for example, in Figs. 3, 4, and 5. A circular hole 22 of approximately the same diameter as the appendix 20 is made in one of the gores 12 at a distance from the apex or top of the balloon 10 where the gore is of sufficient width. The upper end of the appendix 20 is secured at the opening 22 by a clamp which comprises circular plywood disks 24, two aluminum rings 26 and 30, and a gasket ring 28 between and in contact with the margins of the duct appendix and the gore 12, all tightly clamped together by a plurality of screws and nuts 32.

In order to keep the appendix 20 in distended position at the elbow connecting it with the balloon 10, angular tucks 34 are taken in the balloon material and held in place by taped strips 36 and 38 applied over the outsides of the tucks. At intervals of several feet, taped ties 40 connect the adjacent surfaces of the duct appendix 20 and the adjacent gore 12.

With this construction the duct appendix 20 is firmly attached to the balloon 10, and a gas-tight connection is made through the wall of the balloon. The adjacent surface of the gore to which the appendix 20 is attached may be strengthened by tapes 42 and 44 extending radially in the gore and at the marginal edges thereof, respectively.

In a comparison of actual operation as represented by diagrammatic Fig. 2, a balloon X with a conventional appendix and a balloon Y having the duct appendix of this invention will show the indicated difference in operation. Both balloons, if similarly inflated, will reach the ceiling altitude BC from the launching point A in approximately the same time. Due to loss of gas by valving through the appendix or decrease in superheat at the point C, both balloons may descend to the lower altitude D where the same amount of ballast is dropped. At this point, however, a striking difference appears. For the conventional balloon X with a bottom opening appendix, its gas is mixed with air and therefore does not have the lifting power and rises only to the altitude E; whereas in the balloon Y with the duct appendix, there is no mixture of air with the gas in the balloon and it rises to the altitude E' equal to the established ceiling BC and maintains this elevation in a similar manner in successive operations, or it may even rise to an altitude as E'', actually higher than E', by an amount depending on the ratio of the ballast dropped at D to the weight of the system.

Thus, the location of the lower end of the duct appendix 20, the amount of gas, and the size of the balloon may be varied to produce the desired results and to maintain a flight of substantially constant altitude if desired.

By placing the lower end of the duct appendix in a position such that there is still a lower subpressure region while the balloon is filled to its predetermined volume, the following advantages are obtained:

(1) The balloon will be less likely to overvalve, i.e., undergo loss of more gas than that required for equilibrium;

(2) The pressure head in the balloon is decreased, thereby decreasing the stresses in the balloon structure;

(3) The same decrease in pressure head will result in a corresponding decrease in loss of gas by leakage through holes in the balloon material.

By valving or discharging gas at a lower internal pressure than in the conventional method, there is obviously less stress on the balloon structure for a given load. A further advantage is that leakage of the inflation gas from the balloon is reduced because of the overall decreased pressure differential across the fabric.

It is apparent that the duct appendix may be attached at the apex of the balloon by connecting it through a suitable clamping ring which engages at the upper ends of all of the gores. The attachment of the duct appendix is independent of the connection of the gores, whether they are taped together, welded at the edges, or connected by heat-sealing method.

While we have described a preferred embodiment of the invention in some detail, it should be regarded as an example or embodiment of the invention and not as a restriction or limitation therein as many changes may be made in the construction and arrangement of the parts without departing from the spirit and scope of the invention.

We claim:

1. A free high altitude balloon comprising a free high altitude plastic film envelope prepared for launching and having an opening at the top thereof and being otherwise closed, an imperforate duct sealed at one end to the envelope about the opening in constant communication with the envelope thereat and extending throughout its length outside of the envelope and from the opening toward and terminating short of the bottom of the envelope and attached at its lower end to the adjacent part of the side of the envelope, whereby, when the balloon is in flight, gas will escape from the duct bottom whenever the gas in the envelope tends to be superpressured at a level below that of the duct bottom, the gas in the duct serves as the sole barrier preventing atmospheric air from entering the opening when the gas in the envelope at a level below that of the opening is superpressured, and the envelope in flight cannot be fully inflated, the distance of the lower end of the duct from the bottom of the envelope being predetermined to thereby predetermine the desired ceiling altitude of the balloon.

2. The structure of claim 1, characterized in that the balloon consists of the envelope and the attached duct.

3. The structure of claim 1, characterized in that the lower end of the duct is disposed substantially below the equator of the envelope.

4. The structure of claim 1, characterized in that the duct is formed of plastic film and conforms throughout its length with the changing contour of the adjacent part of the side of the envelope in flight.

5. The structure of claim 1, characterized in that the duct is substantially entirely surrounded by the free atmosphere.

References Cited in the file of this patent

UNITED STATES PATENTS 2,526,719  Winzen _____ Oct. 24, 1950

FOREIGN PATENTS 290,716  Great Britain _____ May 16, 1928
873,944  France _____ Apr. 13, 1942